June 20, 1933.  C. L. KAUFMAN  1,914,745
HAND CULTIVATING IMPLEMENT
Filed July 28, 1932
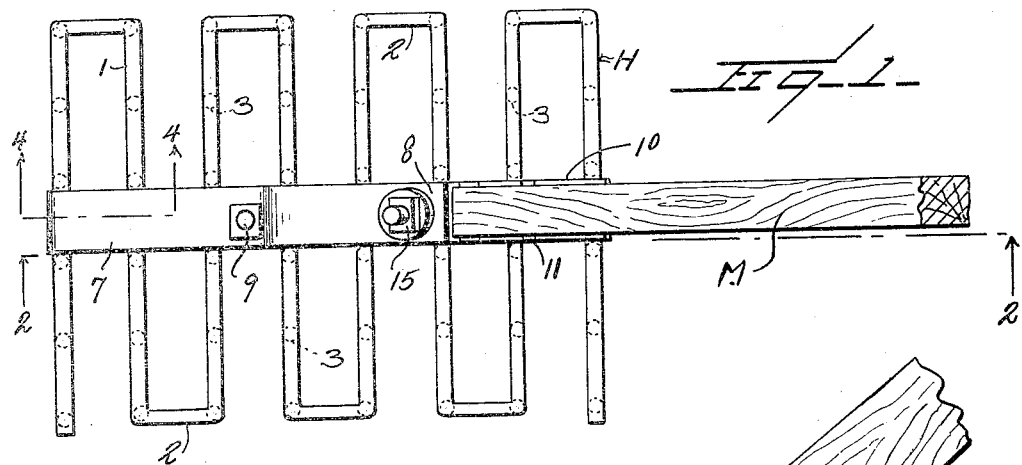
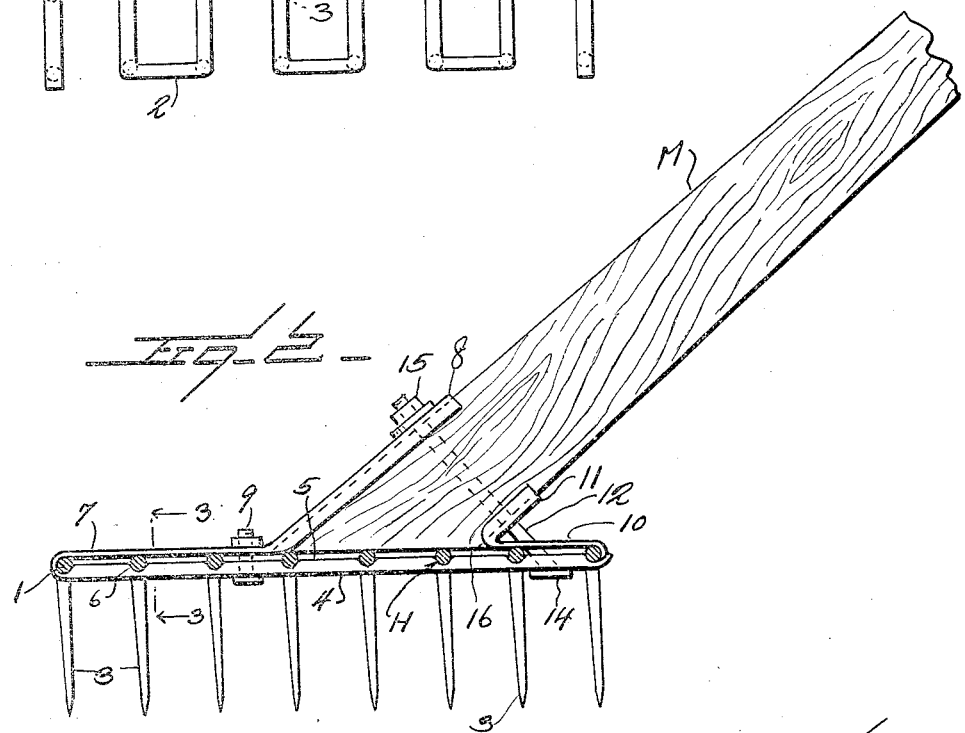
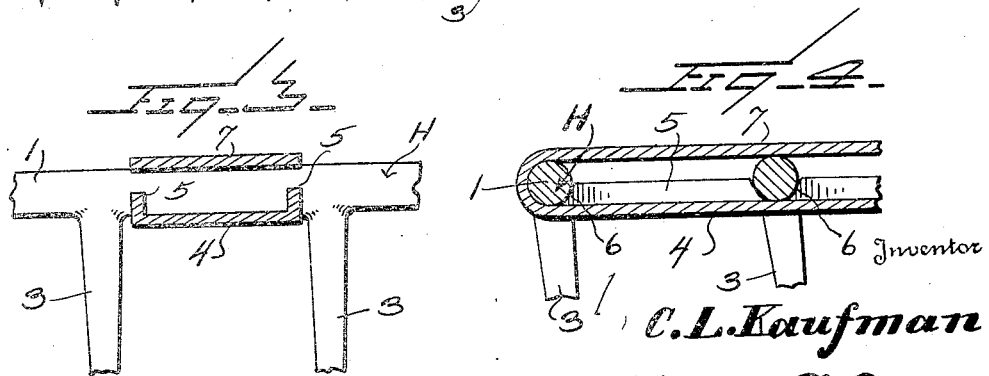
Inventor
C. L. Kaufman
By Watson E. Coleman
Attorney Patented June 20, 1933

1,914,745

UNITED STATES PATENT OFFICE

CHRISTIAN L. KAUFMAN, OF HUDSON, ILLINOIS

HAND CULTIVATING IMPLEMENT

Application filed July 28, 1932. Serial No. 625,461.

This invention relates to a hand cultivating implement and has relation more particularly to a device of this kind which operates after the fashion of a hoe and which is particularly desirable for use in connection with young vegetables, flower beds and gardens.

The invention has for an object to provide a device of this kind constructed in a manner whereby it readily and easily loosens or breaks the soil.

The invention consists in the details of construction and in the combination and arrangement of the several parts of my improved hand cultivating implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan of an implement constructed in accordance with an embodiment of my invention, the operating handle being in fragment;

Figure 2 is a sectional view taken substantially on the line 2—2 of Figure 1;

Figure 3 is an enlarged fragmentary sectional view taken substantially on the line 3—3 of Figure 2;

Figure 4 is an enlarged detailed sectional view taken substantially on the line 4—4 of Figure 1.

As disclosed in the accompanying drawing, my improved implement comprises a head H including a plurality of longitudinally spaced elongated bars 1 arranged substantially in parallelism and having adjacent ends alternately connected by the integrally formed intermediate bars 2. This particular formation of the head H results in the same being what may be generally termed as of a "zigzag" form.

Each of the bars 1 has depending therefrom at desired points therealong ground working teeth 3 herein disclosed as integral with the bar although, of course, said teeth may be otherwise attached.

Disposed lengthwise of the head H at the transverse center thereof and underlying the bars 1 is an elongated channel member 4, the side flanges 5 of which are provided with notches or recesses 6 to receive the bars 1 whereby the head H is maintained in desired form or assembly.

The outer end portion of the member 4 is continued by a reverted arm 7 which is continued by an upwardly inclined channel member 8 to engage from above with the end portion of the handle member M associated with the head H. The member 4 and the member 7 at a point closely adjacent to the junction of the channel member 8 with the member 7 has associated therewith a clamping unit 9 herein set forth as a conventional nut and bolt. This clamping unit serves to effectively hold the member 4 and member 7 to the head H.

The rear portion of the head H above the adjacent extremity of the member 4 has resting thereon a member 10 provided with an inwardly and upwardly inclined channel extension 11 which engages the handle member M from below. Disposed upwardly through the rear portion of the member 4, the channel extension 11, the handle member M and the channel member 8 is an elongated bolt 12 the head 14 of which is so formed as to have effective contact from below with the member 4. The opposite or upper end portion of the bolt 12 has threaded thereon a clamping nut 15 which coacts from above with the channel member 8. This bolt 12 together with the clamping nut 15 serves to effectively anchor the head H to the handle member M.

The end 16 of the handle member M associated with the head H is disposed on a required bevel to permit the handle member M to have desired angular relation with respect to the head H.

My improved implement or hoe as herein disclosed is particularly adapted for use in loosening or breaking the soil in connection with young vegetables or in flower beds or the like, and the implement or hoe is of a character that can be used without undue exertion and with considerable speed. My improved implement or hoe is also especially desirable for use in working the ground as soon as it dries after a rain thus preventing young weeds from starting, as well as preventing the ground from baking and at the same time places the soil in a condition to keep the moisture at the roots of the plants.

From the foregoing description it is thought to be obvious that a hand cultivating implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A cultivating implement of the class described comprising a head including a plurality of longitudinally spaced parallel bars, adjacent extremities of the bars being alternately connected, ground working members depending from the bars, an elongated member underlying the bars at substantially the transverse centers thereof and having notched flanges to receive the bars, one end portion of the elongated member being returned to overlie certain of the bars, said returned member being continued by an angularly disposed member, a handle member, the angularly disposed member overlying a face of the handle member, and means disposed through an end portion of the member underlying the bars through the handle member and through the angularly disposed member for connecting the handle member and head.

2. A cultivating implement of the class described comprising a head including a plurality of longitudinally spaced parallel bars, adjacent extremities of the bars being alternately connected, ground working members depending from the bars, an elongated member underlying the bars at substantially the transverse centers thereof and having notched flanges to receive the bars, one end portion of the elongated member being returned to overlie certain of the bars, said returned member being continued by an angularly disposed member, a handle member, the angularly disposed member overlying a face of the handle member, means disposed through an end portion of the member underlying the bars through the handle member and through the angularly disposed member for connecting the handle member and head, and a clamping medium coacting with the member underlying the bars and the reverted member at a point closely adjacent to the junction of the reverted member with the angularly disposed member.

In testimony whereof I hereunto fix my signature.

CHRISTIAN L. KAUFMAN.